(12) United States Patent
Munday et al.

(10) Patent No.: US 9,753,737 B2
(45) Date of Patent: Sep. 5, 2017

(54) DECLARATIVE ATTRIBUTE SECURITY USING CUSTOM PROPERTIES

(75) Inventors: Terence Munday, Menlo Park, CA (US); Nischal Sanghal, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 990 days.

(21) Appl. No.: 12/722,406

(22) Filed: Mar. 11, 2010

(65) Prior Publication Data

US 2011/0191751 A1  Aug. 4, 2011

Related U.S. Application Data

(60) Provisional application No. 61/300,937, filed on Feb. 3, 2010.

(51) Int. Cl.
 *G06Q 20/00* (2012.01)
 *G06F 9/44* (2006.01)

(52) U.S. Cl.
 CPC ...................................... *G06F 9/44* (2013.01)

(58) Field of Classification Search
 USPC .......................................................... 705/50
 See application file for complete search history.

(56) References Cited

U.S. PATENT DOCUMENTS

| | | |
|---|---|---|
| 5,764,241 A | 6/1998 | Elliott et al. |
| 6,988,109 B2 | 1/2006 | Stanley et al. |
| 7,089,584 B1 | 8/2006 | Sharma |
| 7,243,097 B1 | 7/2007 | Agrawal et al. |
| 7,739,298 B1 * | 6/2010 | Crim .................. G06F 21/6227 707/705 |
| 7,895,409 B2 | 2/2011 | Mendonca |
| 8,001,530 B2 * | 8/2011 | Shitrit ........................... 717/124 |
| 8,099,788 B2 | 1/2012 | Munday |
| 2002/0095405 A1 | 7/2002 | Fujiwara |
| 2003/0058277 A1 | 3/2003 | Bowman-amuah |
| 2003/0093575 A1 | 5/2003 | Upton |
| 2003/0233631 A1 | 12/2003 | Curry et al. |

(Continued)

OTHER PUBLICATIONS

Adding Declarative Security Support; http://msdn.microsoft.com/en-us/library/84kh7ht8(printer).aspx.

(Continued)

*Primary Examiner* — John Hayes
*Assistant Examiner* — John M Winter
(74) *Attorney, Agent, or Firm* — Kilpatrick, Townsend & Stockton LLP

(57) ABSTRACT

In various embodiments, application development tools can allow developers to control whether or not an attribute of a view object is displayed by declaratively associating a data security privilege with the attribute. Associating a data security privilege with the attribute can be done by adding a specially named custom property on the view object attribute. Modifications to a base class can provide any necessary support to retrieve the privilege and determine whether a current user is allowed to view the attribute for the current record/row. If the user is authorized to view the attribute for the current record/row, then the attribute value is returned and displayed. Otherwise, redacting information, such as "*****" can be returned and displayed.

10 Claims, 14 Drawing Sheets

(56) References Cited

U.S. PATENT DOCUMENTS

| | | | |
|---|---|---|---|
| 2004/0024763 A1 | 2/2004 | Anderson | |
| 2004/0181775 A1 | 9/2004 | Anonsen et al. | |
| 2004/0220896 A1 | 11/2004 | Finlay et al. | |
| 2005/0144176 A1 | 6/2005 | Lei et al. | |
| 2005/0216421 A1 | 9/2005 | Barry et al. | |
| 2006/0136479 A1 | 6/2006 | Fan et al. | |
| 2007/0027880 A1 | 2/2007 | Dettinger et al. | |
| 2007/0073695 A1* | 3/2007 | Conlan | G06F 21/6227 |
| 2007/0136291 A1 | 6/2007 | Bird et al. | |
| 2008/0172727 A1 | 7/2008 | Cheng et al. | |
| 2008/0270980 A1 | 10/2008 | Ahadian et al. | |
| 2009/0007269 A1 | 1/2009 | Bianco | |
| 2010/0070763 A1 | 3/2010 | Munday | |
| 2011/0067024 A1* | 3/2011 | Chiu et al. | 717/178 |

OTHER PUBLICATIONS

ACC2000: How to Simulate Column-Level Security in Microsoft Access; Article ID: 304315; Jun. 25, 2004; http://support.microsoft.com/kb/304315.

Record Level Security and Column Level Security; http://www.jinfonet.com/manualpro/userguide/rlsecurity.htm.

Implementing Row- and Cell-Level Security in Classified Databases Using SQL Server 2005; Published Apr. 1, 2005; http://www.microsoft.com/technet/prodtechnol/sql/2005/multisec.mspx.

Hide sensitive data with Oracle 10g column masking; Feb. 20, 2007; http://www.thinkdigit.com/details.php?article_id=269&art_title=Hide%20sensitive%20dat . . . .

A tradeoff analysis between data accessibility and inference control for row, column, and cell level security in relational databases; http://portal.acm.org/citation.cfm?id=1292873&coll=Portal&udl=GUIDE&CFID=1275537 . . . .

Creating Your Own Code Access Permissions; http://msdn.microsoft.com/en-us/library/yctbsyf4(printer).aspx.

Akel, Oracle ADF 11g Primer—Introduction to the building blocks of a Fusion Web application, An Oracle White Paper, Apr. 2007, 12 pages.

U.S. Appl. No. 12/211,797, Non-Final Office Action mailed on Apr. 25, 2011, 23 pages.

U.S. Appl. No. 12/211,797, Notice of Allowance mailed on Sep. 16, 2011, 7 pages.

\* cited by examiner

| Property | Value |
|---|---|
| ObjectId | e.g. PersonId |
| ObjectRef | e.g. PER_PERSONS |

| Property | Value |
|---|---|
| AttributeSecurity | FNDDS__<privilege>__<object name>__<object alias> |

DECLARATIVE ATTRIBUTE SECURITY USING CUSTOM PROPERTIES

CROSS-REFERENCES TO RELATED APPLICATIONS

This application claims priority to and the benefit of U.S. Provisional Application No. 61/300,937, filed Feb. 3, 2010 and entitled "Declarative Attribute Security Using Custom Properties," the entire disclosure of which is herein incorporated by reference for all purposes.

This Application is related to commonly owned copending U.S. patent application Ser. No. 12/211,797 filed Sep. 16, 2008 and entitled "Declarative Data Security for a Rapid Application Development Tool Component," which is incorporated by reference for all purposes.

BACKGROUND OF THE INVENTION

This application generally relates to information systems. Embodiments and/or examples found within the Application more specifically relate to declarative attribute security using custom properties.

Data security is becoming increasing important, especially in an enterprise environment. For example, a large corporation may store information about customers or even its employees that the corporation and/or the employee may want to keep confidential. However, some employees of the corporation may need access to subsets of the data for particular tasks.

Often, data can be stored in a database with relational attributes. For example, all information about a particular customer or employee may be arranged in one row of a table or may otherwise be associated with an employee. For some applications, data regarding an entity, such as an employee, may be persisted as an object for data access. Often, a user, such as a manager, accessing information in the object may have limited clearance to view only a subset of information in the object. The manager may also have access to a limited number of objects. Thus, applying security at the data object level may be insufficient.

Accordingly, what is desired is to solve problems relating to securely accessing data stored in a data repository, some of which may be discussed herein. Additionally, what is desired is to reduce drawbacks related to how users may access secured data stored in a data repository, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be present some innovations, embodiments, and/or examples found within this disclosure in a simplified form as a prelude to a more detailed description presented later.

In various embodiments, application development tools can allow developers to control whether or not an attribute of a view object is displayed by declaratively associating a data security privilege with the attribute. Associating a data security privilege with the attribute can be done by adding a specially named custom property on the view object attribute. Modifications to a base class can provide any necessary support to retrieve the privilege and determine whether a current user is allowed to view the attribute for the current record/row. If the user is authorized to view the attribute for the current record/row, then the attribute value is returned and displayed. Otherwise, redacting information, such as "*****" can be returned and displayed.

In some embodiments, a computer-implement method for developing applications that provide data security may include receiving information specifying a view object as a component of an application development framework. An application developer or other user may interact with one or more user interfaces (e.g., graphical user interfaces) of the application development framework to specify the view object. The view object can define how to obtain data corresponding to business objects stored in a datasource that may be use by an application created by the application development framework. The view object can have at least one attribute corresponding to an attribute of the business objects stored in the datasource. Information defining a custom property of the at least one attribute of the view object is also received. The custom property is configured to enable attribute-based security for the attribute of the business objects stored in the datasource. Additionally, a value for the custom property of the at least one attribute of the view object is provided, the value indicative of one or more security privileges for the attribute of the business objects stored in the datasource. A definition for the view object is then generated. The definition allows instances of the view object instantiated from the definition to provide attribute-based security.

In various embodiments, based on a determination that the one or more security privileges specified in the custom property for the at least one attribute of the view object are not satisfied, a portion of the data is corresponding to the business objects stored in the datasource is cached that excludes data corresponding to the attribute of the business objects. In further embodiments, the information defining the custom property of the at least one attribute of the view object may include information defining the custom property with a predetermined named property designated by the application development framework for attribute-based security. The information defining the custom property of the at least one attribute of the view object may include input from a user interacting with one or more graphical user interfaces associated with the application development framework where the one or more graphical user interfaces configured to enable users to define custom properties for attributes of view object.

In various embodiments, a computer-implemented method for implementing attribute security can include identifying a view object associated with a user interface environment. The view object can define how to obtain for the user interface environment data corresponding to business objects stored in a first datasource. An attribute of the view object corresponding to an attribute of the business objects stored in the first datasource is also identified. The attribute of the view object can include a custom property enabling attribute-based security for the attribute of the business objects stored in the first datasource. A value is then determined for the custom property enabling attribute-based security for the attribute of the business objects stored in the first datasource. The value is indicative of one or more security privileges for the attribute of the business objects stored in the first datasource. A determination is made whether the one or more security privileges specified in the custom property for the attribute of the view object are satisfied. Based on a determination that the one or more security privileges specified in the custom property for the attribute of the view object are not satisfied, a portion of the data corresponding to the business objects stored in the first datasource that excludes data corresponding to the attribute of the business objects is then cached in a second datasource.

In still further embodiments, based on a determination that the one or more security privileges specified in the custom property for the attribute of the view object are satisfied, a portion of the data corresponding to the business objects stored in the first datasource that includes data corresponding to the attribute of the business objects is cached in the second datasource. The cached portion of the data may be presented to the user interface environment based on the view object. The view object may define how to present for the user interface environment the data corresponding to the business objects stored in the first datasource. Presenting the cached data to the user interface environment may include generating information causing the user interface environment to display the second data with a visual indication that the one or more security privileges specified in the custom property for the attribute of the view object have not been satisfied. Presenting the cached data to the user interface environment may include generating information causing the user interface environment to display the second data with a series of asterisks in place of the data corresponding to the attribute of the business objects.

Other methods, systems, apparatuses, computer-readable storage media, and other articles of manufacture that may incorporate an embodiment, may be incorporated into an embodiment, or may be used to practice any of the innovations, embodiments, and/or examples found within this disclosure are contemplated.

A further understanding of the nature of and equivalents to the subject matter of this disclosure (as wells as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 9 is a screenshot of a graphical user interface that may be associated with the application development tool of FIG. 2 allowing users to define custom properties at the view object level for implementing attribute security in accordance with various embodiments.

FIG. 10 is a screenshot of a graphical user interface that may be associated with the application development tool of FIG. 2 allowing users to define custom properties on an attribute of a view object for implementing attribute security in accordance with various embodiments.

DETAILED DESCRIPTION OF THE INVENTION

Figure 1:
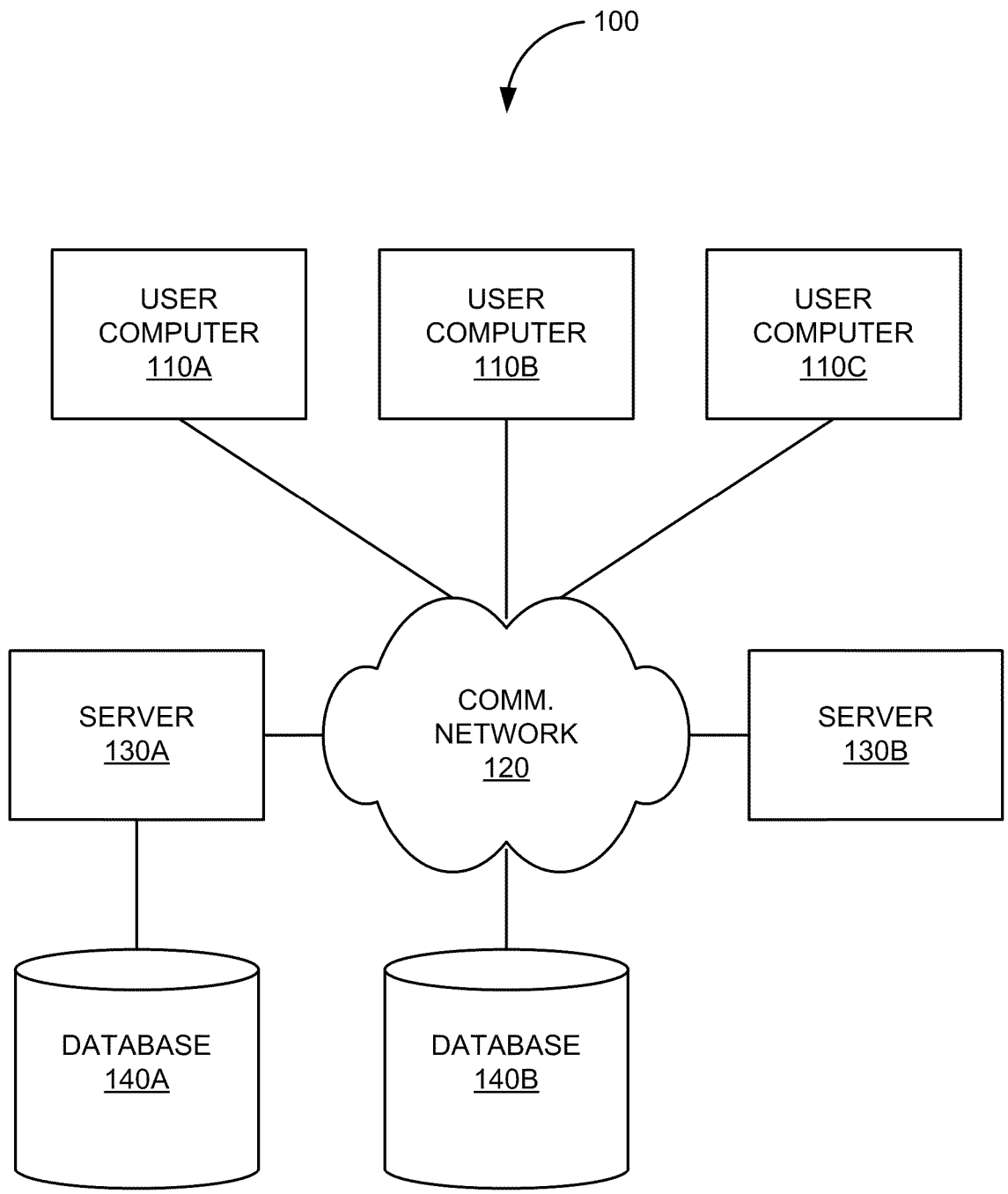
FIG. 1 is a simplified illustration of a system that may incorporate an embodiment or be incorporated into an embodiment of any of the innovations, embodiments, and/or examples found within this disclosure.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 120 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

In various embodiments, system 100 can include applications developed using one or more application development tools or frameworks. A application development tool or framework may include hardware and/or software elements configured for building enterprise applications. The tool or framework may provide visual and declarative approaches to application development. In some embodiments, the tool or framework may support rapid application development based on ready-to-use design patterns and metadata-driven and visual tools.

Figure 2:
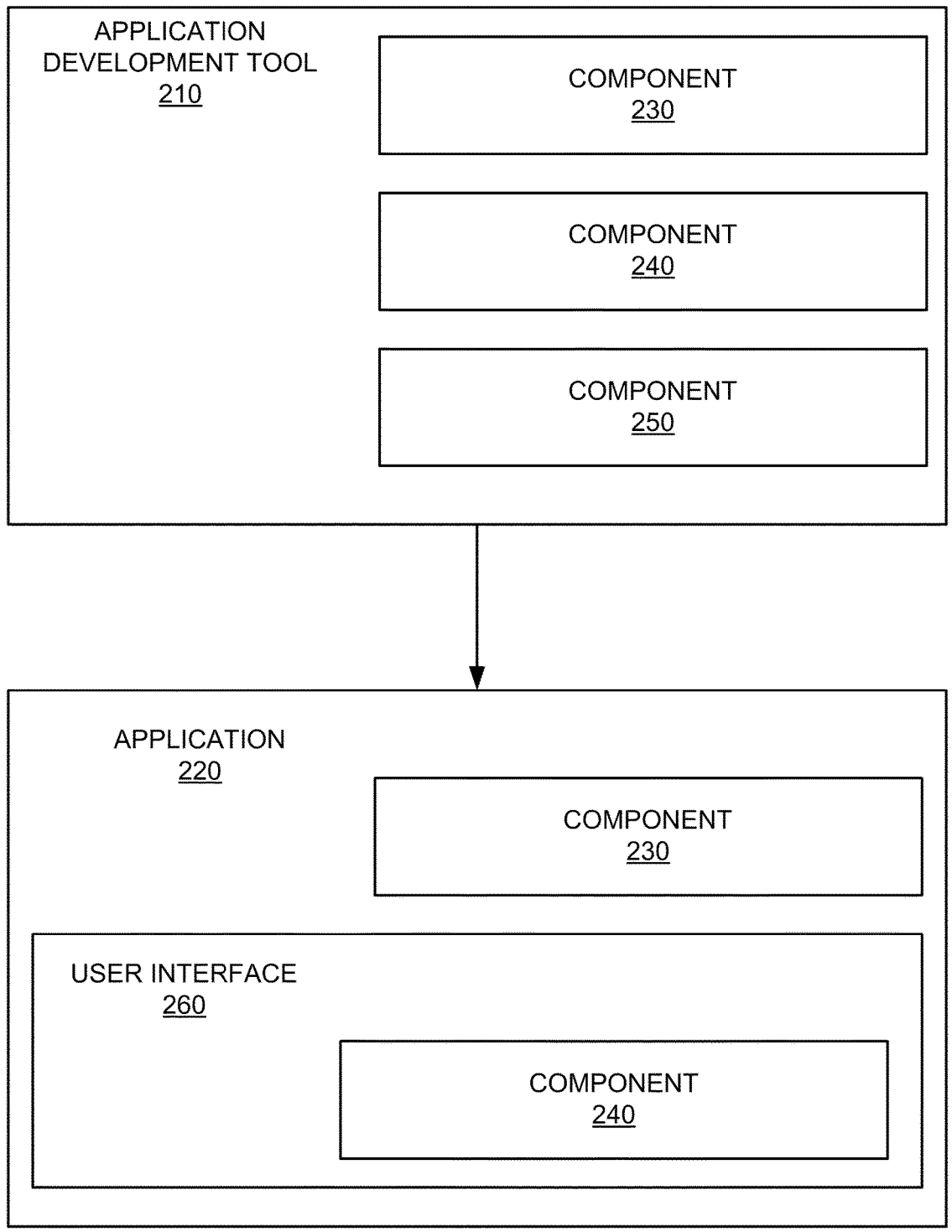
FIG. 2 is a block diagram representing components of an application development tool that may used in connection with any of the innovations, embodiments, and/or examples found within this disclosure.

FIG. 2 is a block diagram representing components of application development tool 210 that may used in connection with any of the innovations, embodiments, and/or examples found within this disclosure shows. Application development tool may be embodied as a rapid application development tool. In one example, application development tool 210 can utilize web application frameworks or other types of software frameworks to speed application development. Prototypes or templates can be provided as easily-added building blocks for user interface modules and other components of an application or another user interaction environment. A designer utilizing application development tool 210 typically does not have to build individual components of application 220 or another user interaction environment, but instead can utilize readily available components 230, 240, and 250 associated with application development tool 210. Components 230, 240, and 250 may be selected for use in application 220 via a wizard or other tool, or may be implemented using drag and drop or other methods. Components associated with application development tool 210 may include several different options for display or function. In an embodiment shown in FIG. 2, application 220 utilizes two of the components associated with application development tool 210, specifically components 230 and 240. Components 230 and 240 can serve as application modules for application 220, and may perform different functions when rendered or otherwise executed in a user interaction environment.

In various embodiments, application development tool 210 may be embodied as Oracle International Corporation's Application Development Framework, also called "ORACLE ADF." ORACLE ADF is a commercial Java framework for creating enterprise applications and user interaction environments. ORACLE ADF is based upon a model-view-controller architecture, which is known and documented. See, for example, "Oracle ADF 11g Primer; Introduction to the building blocks of a Fusion Web application" (An Oracle White Paper, April 2007), which is incorporated by reference for all purposes. Although ORACLE ADF is provided as an example, other application development tools or frameworks may be utilized in other environments utilizing techniques disclosed herein. However, for ease of description, some examples herein involves use of ORACLE ADF.

In general, a model-view-controller architecture isolates business logic (e.g., data) from user interface considerations, resulting in an application or user interaction environment where it is easier to modify either the visual appearance of a user interaction environment or the underlying business rules without affecting the other. In a model-view-controller architecture, a model represents the information (or data) of an application and business rules used to manipulate that data. A view corresponds to elements or controls of a user interface such as text, check box items, and so forth, and the controller manages details involving the communication to the model of user actions such as keystrokes and mouse movements.

Figure 3:
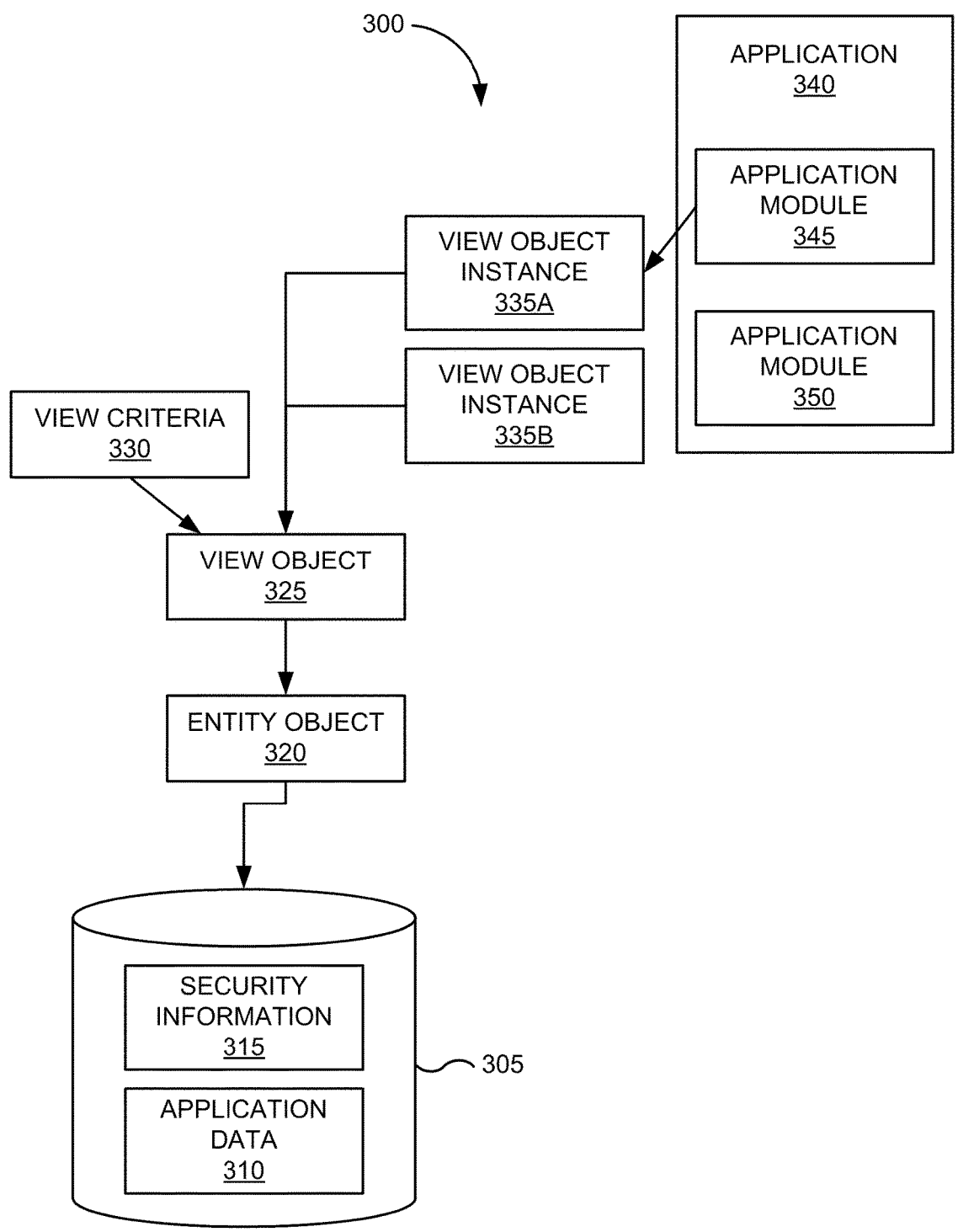
FIG. 3 is a block diagram representing a data model architecture for an application developed using the application development tool of FIG. 2.

FIG. 3 is a block diagram representing data model architecture 300 for application 220 developed using application development tool 210 of FIG. 2. Data model architecture 300 may be created by ORACLE ADF, in accordance with an embodiment. In this example, database 305 represents a model in a model-view-controller architecture. Database 305 can maintain application data 310, for example as data regarding employees. Database 305 may also include security information 315. Application data 310 and security information 315 may be maintained within one or more databases of database 305 or otherwise associated with database 305.

Entity object 320 can include information representing persisted data regarding an entity, such as a person, from database 310. In one example, entity object may represent a row in a database table of database 305, where information for attributes of the entity are stored in the row. Entity object 320 may also encapsulate business logic for an entity. For example, entity object 320 may ensure that business rules are consistently enforced.

View object 325 represents a view in a model-view-controller architecture. View object 325 may include information for obtaining data from database 305, such as an SQL query. View object 325 may specify filtered subsets of business data that can be related to attributes from entity object 320. View object 325 may be created and adapted based upon what a developer needs an application to display. In various embodiments, view object 325 can utilize view criteria 330. View criteria 330 can include one or more parameters to define data that is provided from database 305 via entity object 320.

In ORACLE ADF, views of data can be based on, but are independent of, the underlying entity objects. This enables flexible data retrieval to support a required user interface of an application. For example, view object 325 can define the attributes of the view row class, which represents a row in a query result, and optionally refer to underlying entity objects. View object 325 can also provide the application with row sets that can be scrolled through and updated without concern for knowledge of the underlying entity objects.

In this example, instances of view object 325 (e.g., view object instances 335A and 335B) may be used to bind data to components of application development tool 210. Application 340 developed by application development tool 210 may include one or more application modules, such as application modules 345 and 350 which may have one or more of view object instances 335A and 335B defined therein. Accordingly, users can manipulate data by navigating through row sets, getting and setting attribute values. Changes can be made to the data and underlying database when a transaction is completed.

Figure 4:
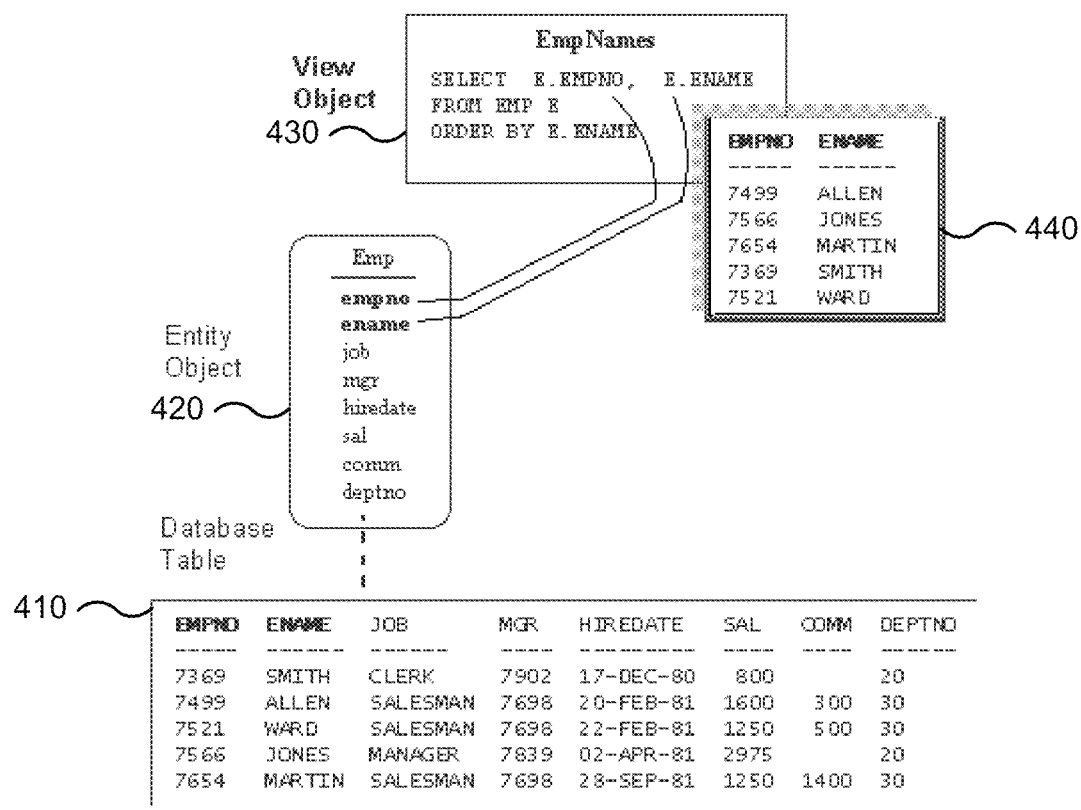
FIG. 4 is a diagrammatic representation of an example of an implementation of the data model architecture of FIG. 3.

FIG. 4 is a diagrammatic representation of an example of an implementation of data model architecture 300 of FIG. 3. In this example, database table 410 maintains information about employees, such as employee number, employee name, job, manager, hire date, and so forth. Entity object 420 can be created from information in database table 410 that may include, for example, all information about a particular employee. In some embodiments, this information represents a row in database table 420. Entity object 420 may further incorporate or join other information to represent an entity. Thus, entity object 420 may be persistent data and can be accessed by one or more view objects. In the example shown, view object 430 named EmpNames operates on entity object 420. An instance of view object 440 (e.g., view object instance 450 can provide a view of the employee numbers and the employee name columns of database table 410.

Figure 5:
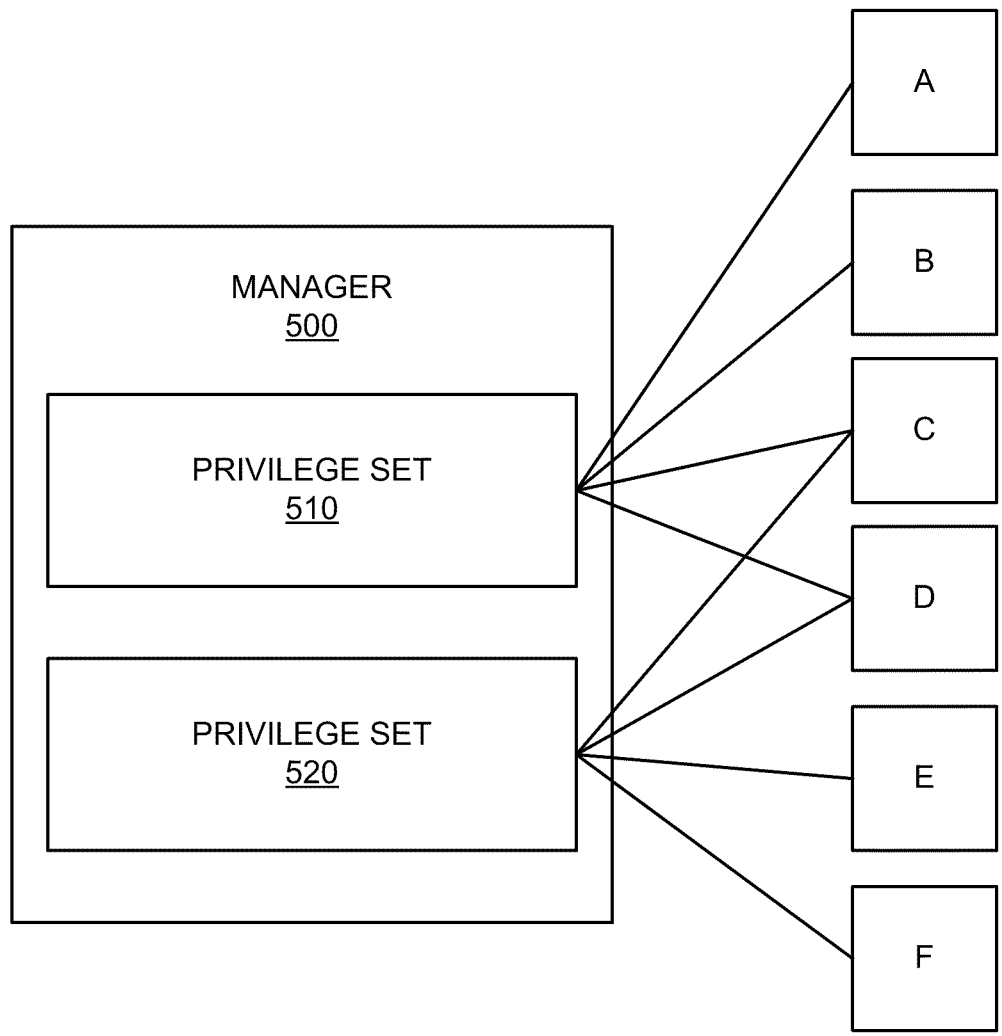
FIG. 5 is a block diagram representing of an example of a single manager having multiple roles and different sets of privileges with different sets of persons that may use an application developed using the application development tool of FIG. 2.

Accordingly, data model architecture 300 of FIG. 3 can work well as a software architecture. However, architecture 300 may run into problems when different levels of security are required at application modules 345 and 350 that are bound to a single view object instance. FIG. 5 is a block diagram representing of an example of a single manager having multiple roles and different sets of privileges with different sets of persons that may use an application developed using application development tool 210 of FIG. 2. Considering this example, manager 500 may have two roles, one as a line manager and another as a human resources specialist. Each of these roles may have a different set of data security privileges.

The human resources specialist role can be associated with privilege set 510 that includes a MANAGE_PERSON_DATA security privilege. The line manager role can be associated with privilege set 520 that includes a MANAGE_PERSON_DATA security privilege and a COMPARE_PERSON_DATA security privilege. Each of privilege sets 510 and 520 can provide access to a different set of data and to a different set of persons. In accordance with the line manager's privileges, the MANAGE_PERSON_DATA security privilege of privilege set 510 provides access to persons A, B, C, and D. In accordance with the human resource specialist's privileges, the COMPARE_PERSON_DATA security privilege provides of privilege set 520 provides access to persons C, D, E, and F.

One problem encountered within this example is that when data security is applied at the entity object level, manager 500 may have access to more data than is permitted via established security privileges. If the MANAGE_PERSON_DATA security privilege is applied at the entity object level, then manager 500 would only have access to persons A, B, C, and D, even for functions associated with the COMPARE_PERSON_DATA security privilege. Likewise, if the COMPARE_PERSON_DATA security privilege is applied at the entity object level, then manager 500 would have access only to persons C, D, E, and F. If an aggregate privilege was applied at the entity object level that contained both the MANAGE_PERSON_DATA security privileges and the COMPARE_PERSON_DATA security privileges, then manager 500 would see a union of the sets, with users A, B, C, D, E, and F. This scenario would allow manager 500 to perform a COMPARE operation on persons A and B, in addition to C, D, E, and F, which should not be permitted under the security scenario.

Declarative Data Security

In accordance with various embodiments, application development tool 210 can be extended to allow security privileges to be linked to instances of view objects. Accordingly allowing security to be set for particular application modules while still using the same entity object. To this end, security privilege view object instances can be developed that are view object instances linked to data security privileges, such as privileges maintained with security information 315 of FIG. 3. These security privilege view object instances may be used in a manner such as view object instances 335A and 335B shown in FIG. 3. That is, the security privilege view object instances may be used to bind data to components or application modules, such as application modules 345 and 350, for use in a rapid application development tool, such as application development tool 210. In various embodiments, this allows row level security of application data 310. Various techniques for declarative data security are described further in related commonly owned co-pending U.S. patent application Ser. No. 12/211,797 filed Sep. 16, 2008 and entitled "Declarative Data Security for a Rapid Application Development Tool Component," which is incorporated by reference.

Declarative Attribute Security

In accordance with further embodiments, application development tool 210 can be extended to allow security privileges for attributes of entities. In various embodiments, attribute security determines whether or not a user can view a particular attribute of an object, such as view information stored in a particular field in a record or column in a row. Considering a different example where manager 500 has two roles: one of a line manager and the other as an employee. As the line manager, manager 500 should be able to see salaries of his/her direct reports, but not the salaries for anyone else. As an employee, manager 500 should be able to see basic details such as name and work telephone number for all other employees in a company, but not other personal or privileged information. Therefore, attribute security can enable view object instances to hide salary information for all people that are not direct reports of manager 500 and other personal or privileged information of all other employees in the company.

In various embodiments, application development tool 210 can allow developers to control whether or not an attribute of a view object is displayed by declaratively associating a data security privilege with the attribute. In one embodiment, associating a data security privilege with the attribute can be done by adding a specially named custom property on the view object attribute. Modifications to a base class can provide any necessary support to retrieve the privilege and determine whether a current user is allowed to view the attribute for the current record/row. If the user is authorized to view the attribute for the current record/row, then the attribute value is returned and displayed. Otherwise, redacting information, such as "*****" can be returned and displayed.

Figure 6:
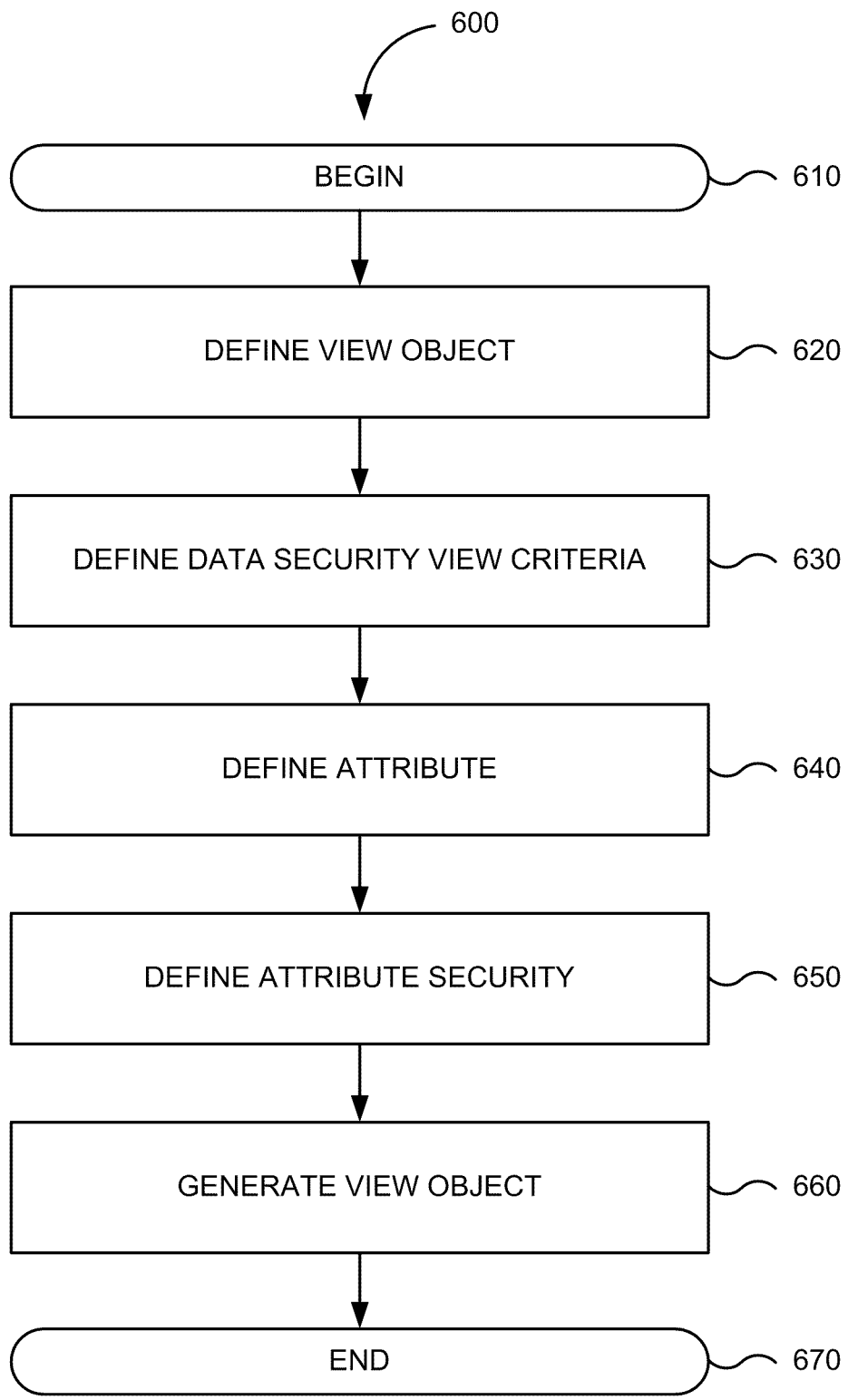
FIG. 6 is a flowchart of a method for creating attribute security privileges for view object instances in accordance with various embodiments.

FIG. 6 is a flowchart of method 600 for creating attribute security privileges for view object instances in accordance with various embodiments. The processing of method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a view object is defined. For example, an application developer may utilize one or more application development tools to create, define, or code one or more view objects. View objects can be components of an application development tool or frame defining how to collect data from a datasource, how to shape that data for use by clients, and how the clients can change or manipulate that data (e.g., using a cache). The view objects can be ORACLE ADF framework components. The view objects can be used for reading rows of data, creating and storing rows of transient data, as well as automatically coordinating inserts, updates, and deletes made by applications with underlying business objects.

In step 630, data security view criteria is defined. For example, the application developer may utilize the one or more application development tools to define how to filter entities in a datasource displayed to a user based on a custom privilege. The filtering of an entities may include a determination of which rows in a database that represent entities should be available to an application. In some embodiments, a dummy view criteria is created in the view object with no view criteria items. The view criteria can be named using one of the following formats:

FNDDS_<privilege>_<object name>_<object alias>
FNDDS_<privilege>_<object name>

The view criteria can then be applied to a view object instance in an application module. Various techniques for declarative data security are described further in related commonly owned co-pending U.S. patent application Ser. No. 12/211,797 filed Sep. 16, 2008 and entitled "Declarative Data Security for a Rapid Application Development Tool Component," which is incorporated by reference.

In step 640, an attribute is defined. When a database is used as the datasource, attributes of the defined view objects can correspond to query columns, which often correspond to table columns. Similarly, in non-database cases, view object attributes can correspond to attributes of datasource objects. Thus, view object attributes often correspond to entity object attributes, wherever they may be stored or found. In various embodiments, some or all of a view object's attributes may be mapped to an entity object attributes. Information associated with the attributes can be stored in a cache managed by the entity object.

Figure 7:
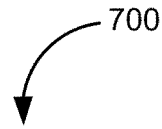
FIG. 7 is a illustration of a table of custom properties defined at the view object level for implementing attribute security in accordance with various embodiments.

In step 650, attribute security is defined. For example, the application developer may utilize the one or more application development tools to define how to filter attributes or elements of entities in a datasource displayed to a user based on a custom privilege. The filtering of attributes or elements of entities may include a determination of which columns in a database that represent attributes or elements of entities should be available to an application. In some embodiments, one or more custom properties may be defined at the view object level. FIG. 7 is a illustration of table 700 of custom properties defined at the view object level for implementing attribute security in accordance with various embodiments. For example, an object identifier (ObjectId) and object reference (ObjectRef) may be defined, along with appropriate values.

Figure 8:
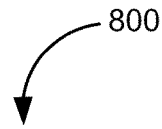
FIG. 8 is a illustration of a table of custom properties defined on an attribute of a view object for implementing attribute security in accordance with various embodiments.

Returning to FIG. 6, a custom property may also be defined on the view object attribute to secure it. FIG. 8 is a illustration of table 800 of custom properties defined on an attribute of a view object for implementing attribute security in accordance with various embodiments. For example, an attribute security property (e.g., AttributeSecurity) may be defined, along with an appropriate value.

In step 660, a view object is generated. In some embodiment, individual view objects can be partially defined by XML files. These files can specify metadata, such as a query that retrieve's the view objects data, view object attributes, and entity object usages. In addition to one or more XML files, view objects can be defined by one or more classes, such as Java classes. For example, a view object class where an instance of this class is a view object instance; that is, a particular reference to a Oracle ADF view object definition within an application module definition. In another example, a view row class where an instance of this class represents a single row returned by the view object's mechanism. FIG. 6 ends in step 670.

Figure 9:
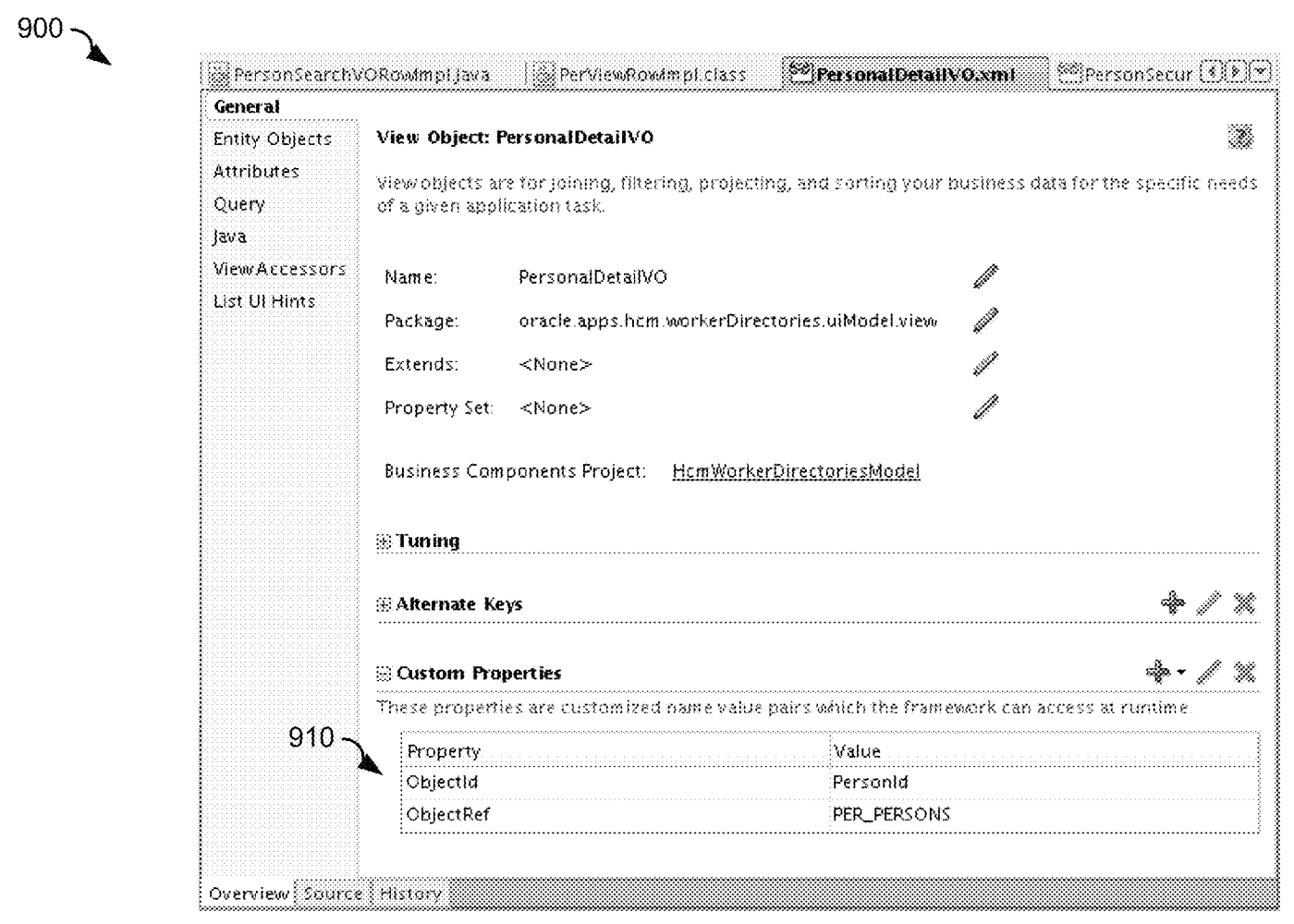

FIG. 9 is a screenshot of graphical user interface (GUI) 900 that may be associated with application development tool 210 of FIG. 2 allowing users to define custom properties at the view object level for implementing attribute security in accordance with various embodiments. In this example, a user or application developer may interact with GUI 900 during one or more interactive sessions to define a view object, specify metadata, view object attributes, and entity object usages. In various embodiments, a user or application developer may interact with GUI 900 to specify custom properties 910 of a view object. Custom properties 910 may include information that establishes how it is known that a particular view object will filter attributes or elements of entities in a datasource.

Figure 10:
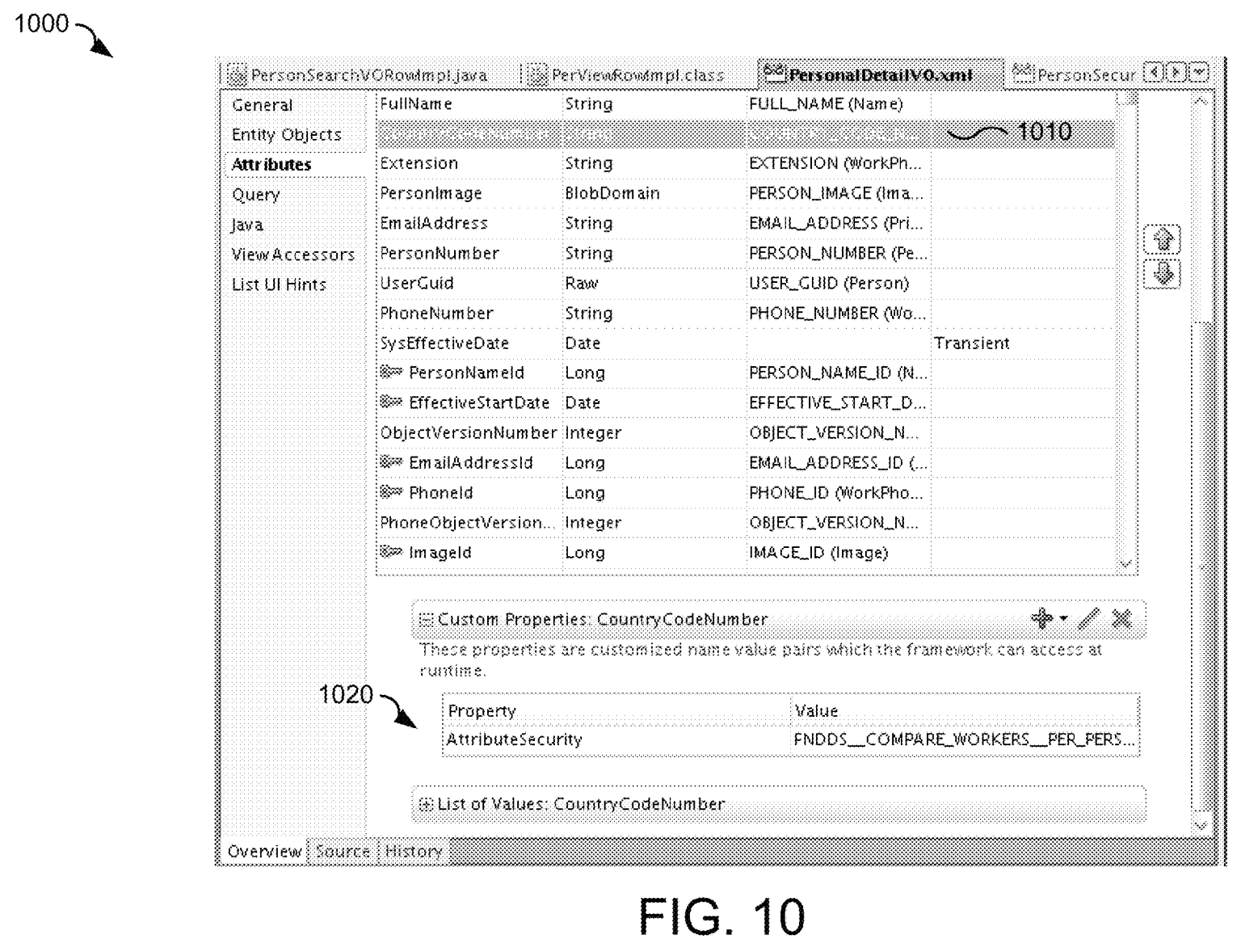

FIG. 10 is a screenshot of graphical user interface (GUI) 1000 that may be associated with application development tool 210 of FIG. 2 allowing users to define custom properties on an attribute of a view object for implementing attribute security in accordance with various embodiments. In this example, a user or application developer may interact with GUI 1000 during one or more interactive sessions to define view object attributes. In various embodiments, a user or application developer may interact with GUI 1000 to select one or more view object attributes for definition. For example, by selecting view object attribute 1010, a user or application developer may specify custom properties 1020 of view object attribute 1010. Custom properties 1020 may include information that establishes how a particular view object attribute will be filtered, security privileges or the attribute, or the like. The value of custom property 1020 may be set to a properly formatted data security privilege name.

Figure 11:
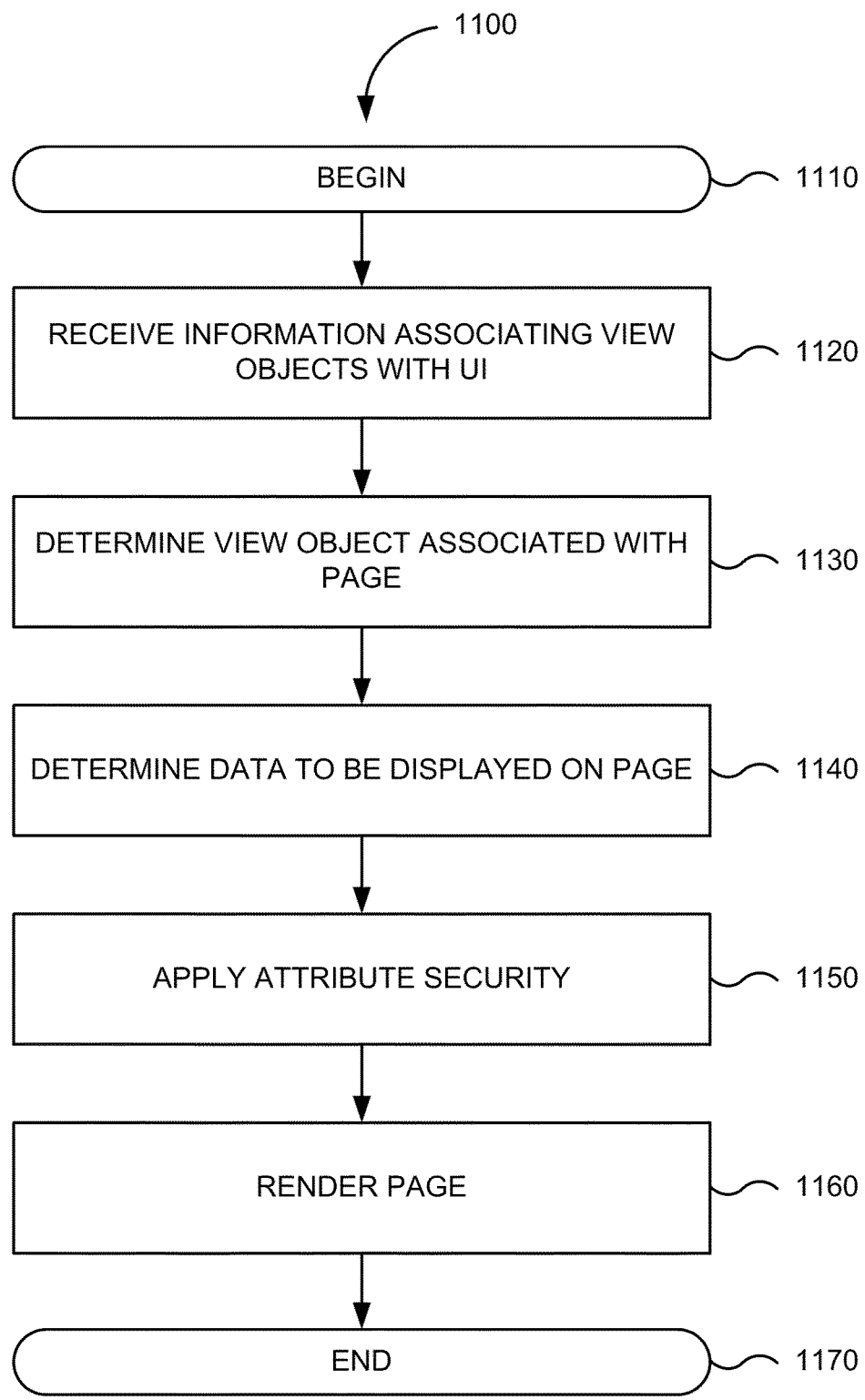
FIG. 11 is a flowchart of a method for rendering a page based on attribute security privileges for view object instances in accordance with various embodiments.

FIG. 11 is a flowchart of method 1100 for rendering a page based on attribute security privileges for view object instances in accordance with various embodiments. The processing of method 1100 depicted in FIG. 11 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1100 depicted in FIG. 11 begins in step 1110.

In step 1120, information associated with view objects with user interfaces is received. For example, an application developer can define applications modules associated with instances of view objects created according to method 600 of FIG. 6.

In step 1130, a view object associated with a page is determined. A page may represent a user interface to an application. The application may include a standalone application, a web application, a web site, or the like that provides an interface to a user. The page may be requested by a user via a web browser.

In step 1140, data to be displayed on the page is determined. A portion of the data may be determined based on the determined view object. For example, a set of rows representing entities may be determined to be available in a database. Which entities that are available in the data may be filtered based on data security declared in the view object.

In step 1150, attribute security is applied. For example, which attributes of the entities that are available in the data may be filtered based on attribute security declared in attribute properties of attributes of the view object. A check may be performed to see whether properties are set for a particular attribute security. Privilege checks can be performed to determine whether the user can view the attribute for a current entity, for example based on their roles. As a result of rending the page in step 1160, an attribute may be displayed if the user has the privileges to access or otherwise view the attribute. In some embodiments, "***" or other forms of redacting or hiding are displayed if the user does not have sufficient privileges. FIG. 11 ends in step 1170**.

Figure 12:
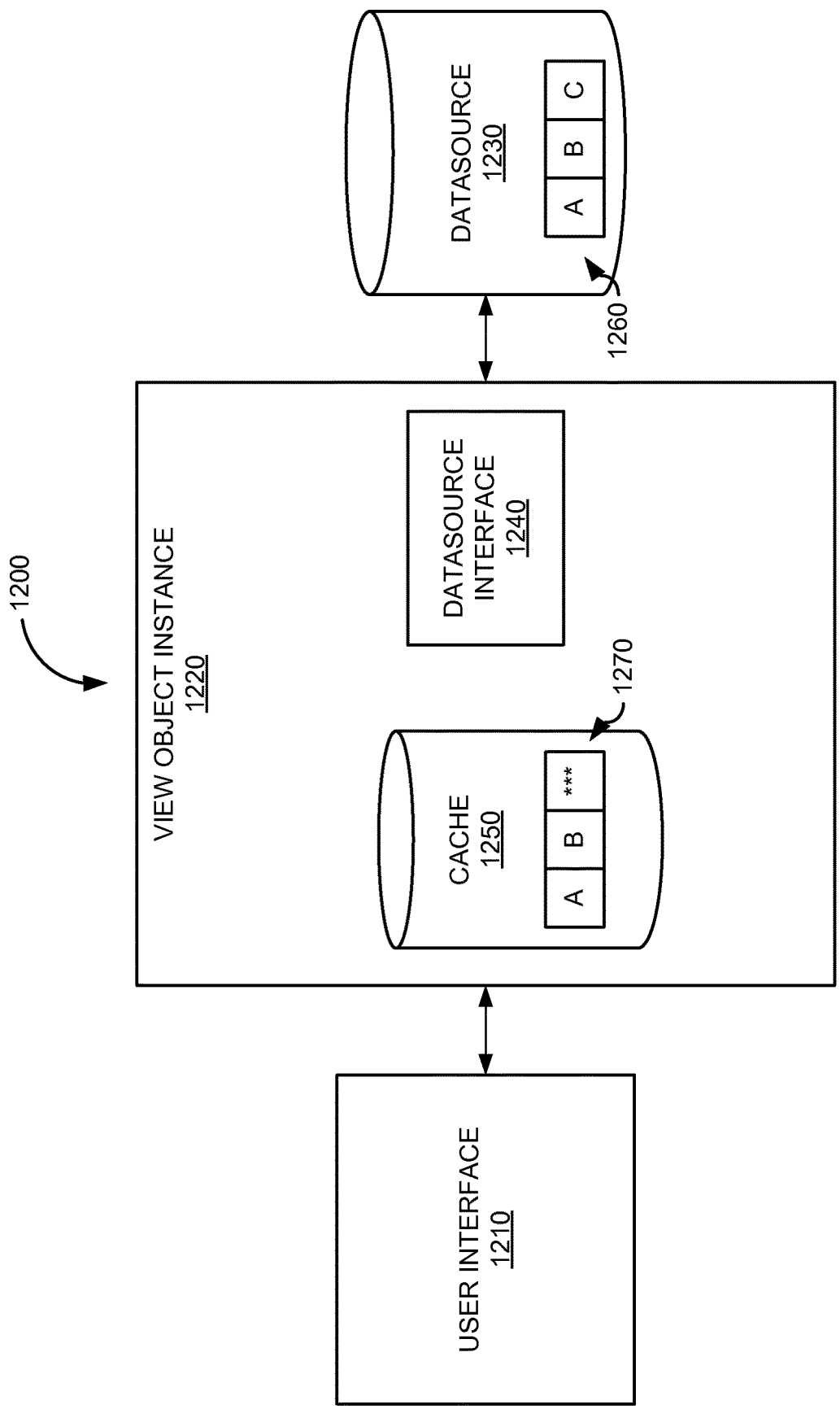
FIG. 12 is a block diagram of a system for implementing attribute security in accordance with various embodiments.

FIG. 12 is a block diagram of system 1200 for implementing attribute security in accordance with various embodiments. In this example, system 1200 includes user interface 1210, view object instance 1220, and datasource 1230. User interface 1210 can include any user interface, graphical user interface, or the like. User interface 1210 can render pages or other user interface elements based on data provided from datasource 1230 by view object instances 1220.

View object instance 1220 can include datasource interface 1240 and cache 1250. Datasource interface 1240 may include mechanisms, procedures, functions, or the like to read data from datasource 1230 or write data to datasource 1240. Datasource interface 1240 may incorporate query commands, such as SQL, or the like. Data obtained from datasource 1230 or that may be stored to datasource 1230 may be locally cached in another datasource, such as cache 1250.

In various embodiments, application of attribute-based security by view object instance 1220 results in a portion of data corresponding to business objects or other entities stored in datasource 1220 being stored in cache 1250 excluding data corresponding to attributes of the business objects stored in datasource 1220. This may be due to failure of one or more security privileges stored in a custom property of an attribute of view object instance 1220 to be satisfied.

Consider an example, where a user named "Terry Lucca" can see employment details for the people who report to him, but cannot see employment details for people who do not report to him. For this example, attribute security can be applied to the employee attributes of work phone, home phone, mobile phone, and work country. Thus, data corresponding to employee 1260 (e.g., values A, B, and C) may be stored in datasource 1230. Application of attribute security by view object instance 1220 may result in employee 1260 being cached in cache 1240 as entity 1270. Note that the data excludes those attributes for people who do not report to him (e.g., values A, B, but not C—represented by "***").

Figure 13:
FIG. 13 is a screenshot of a portion of a web page or other graphical user interface showing portions of entity information that may be made available.

FIG. 13 is a screenshot of portion 1300 of a web page or other graphical user interface showing portions of entity information that may be made available. Applying attribute security allows the user "Terry Lucca," in this example, to have sufficient privileges to view all employment details, such as the work phone, home phone, mobile phone, and work country of employee "Anna Pascal."

Figure 14:
FIG. 14 is a screenshot of a portion of a web page or other graphical user interface showing portions of entity information that are redacted or otherwise hidden from user view based on a view object implementing attribute security in accordance with various embodiments.

FIG. 14 is a screenshot of portion 1400 of a web page or other graphical user interface showing portions of entity information that are redacted or otherwise hidden from user view based on a view object implementing attribute security in accordance with various embodiments. Applying attribute security prevents the user "Terry Lucca," in this example, from viewing all employment details of employee "Luke Hunt." The employee attributes of work phone, home phone, mobile phone, and work country of employee "Luke Hunt" are redacted or otherwise hidden from view on the page. Other visual indicators of applied security privileges may be employed.

Figure 15:
FIG. 15 is another screenshot of a portion of a web page or other graphical user interface showing portions of entity information that are redacted or otherwise hidden from user view based on a view object implementing attribute security in accordance with various embodiments.

FIG. 15 is another screenshot of portion 1500 of a web page or other graphical user interface showing portions of entity information that are redacted or otherwise hidden from user view based on a view object implementing attribute security in accordance with various embodiments.

The following provide one or more examples for rendering a page based on attribute security privileges for view object instances in accordance with various embodiments that may be applied to ORACLE ADF.
1. Override the getAttributeInternal method in the oracle.apps.hcm.commonHcm.HcmViewRowImpl class.
2. Perform the following operations in the overridden getAttribute internal method:
   a. Get the view object
   b. Retrieve the "ObjectRef" property value from the view object
   c. Retrieve the "ObjectId" property value from the view object
   d. Get the attribute definition object
   e. Retrieve the "AttributeSecurity" property value from the attribute definition object
   f. Validate the retrieved property values
   g. Perform a security check to see if the user has permission to see this attribute on the current record/row.
      i. Return the attribute value if the user has permission to see this attribute on the current record/row.
      ii. Return "*****" if the user does NOT have permission to see this attribute on the current record/row.

The following provide one or more examples for applying attribute security privileges declaratively for view object instances in accordance with various embodiments that may be applied to ORACLE ADF.
1. Define a custom property on a view object named "ObjectRef" and set the value to an existing OBJ_NAME in the FND_OBJECTS table (e.g. PER_PERSONS).
2. Define a custom property on a view object named "ObjectId" and set the value to view object attribute representing the objects id (e.g. PersonId).
3. Define a custom property on a view object attribute named "AttributeSecurity" and set the value to the data security privilege to check.
4. Repeat step 3 for each view object attribute to be secured.

Figure 16:
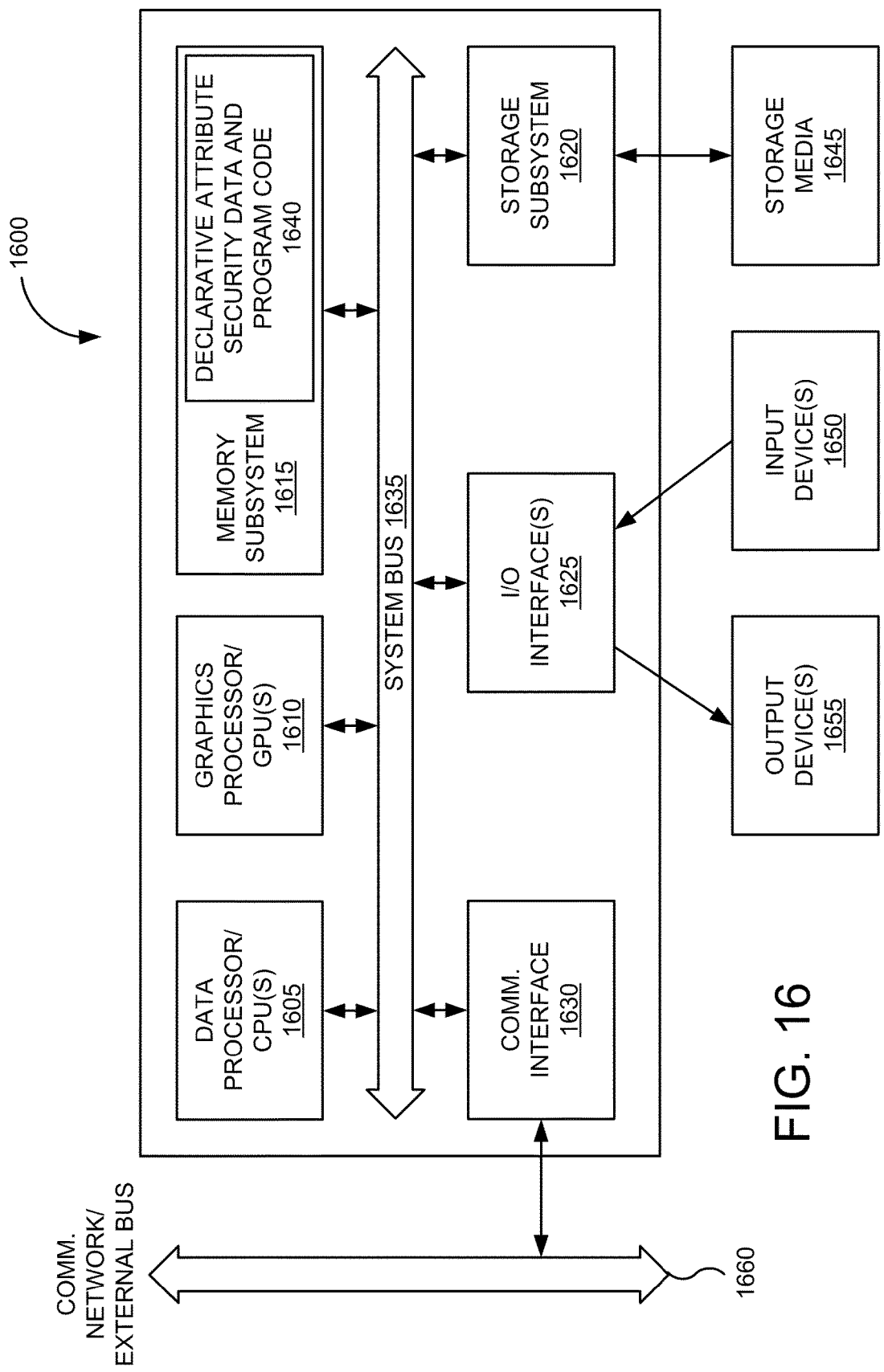
FIG. 16 is a simplified block diagram of a computer system that may incorporate an embodiment, be incorporated into an embodiment, or be used to practice any of the innovations, embodiments, and/or examples found within this disclosure.

FIG. 16 is a block diagram of computer system 1600 that may incorporate an embodiment, be incorporated into an embodiment, or be used to practice any of the innovations, embodiments, and/or examples found within this disclosure. FIG. 16 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1600 can include hardware and/or software elements configured for performing logic operations and calculations, input/output operations, machine communications, or the like. Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication. Computer system 1600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1605 can include hardware and/or software elements configured for executing logic or program code or for providing application-specific functionality. Some examples of CPU(s) 1605 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 1605 may also include one or more field-gate programmable arrays (FPGAs), application-specific integrated circuits (ASICs), or other microcontrollers. The one or more data processors or central processing units (CPUs) 1605 may include any number of registers, logic units, arithmetic units, caches, memory interfaces, or the like. The one or more data processors or central processing units (CPUs) 1605 may further be integrated, irremovably or moveably, into one or more motherboards or daughter boards.

The one or more graphics processor or graphical processing units (GPUs) 1610 can include hardware and/or software elements configured for executing logic or program code associated with graphics or for providing graphics-specific functionality. GPUs 1610 may include any conventional graphics processing unit, such as those provided by conventional video cards. Some examples of GPUs are commercially available from NVIDIA, ATI, and other vendors. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like. The one or more data processors or central processing units (CPUs) 1605 may further be integrated, irremovably or moveably, into one or more motherboards or daughter boards that include dedicated video memories, frame buffers, or the like.

Memory subsystem 1615 can include hardware and/or software elements configured for storing information. Memory subsystem 1615 may store information using machine-readable articles, information storage devices, or computer-readable storage media. Some examples of these articles used by memory subsystem 1670 can include random access memories (RAM), read-only-memories (ROMS), volatile memories, non-volatile memories, and other semiconductor memories. In various embodiments, memory subsystem 1615 can include declarative attribute security data and program code 1640.

Storage subsystem 1620 can include hardware and/or software elements configured for storing information. Storage subsystem 1620 may store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of declarative attribute security data and program code 1640 may be stored using storage subsystem 1620.

In various embodiments, computer system 1600 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 1600 may also include one or more applications configured to executed, perform, or otherwise implement techniques disclosed herein. These applications may be embodied as declarative attribute security data and program code 1640. Additionally, computer programs, executable computer code, human-readable source code, interpreted code, rendering engines, processing engines, or the like, and data, such as business object data, business models, or the like, may be stored in memory subsystem 1615 and/or storage subsystem 1620.

The one or more input/output (I/O) interfaces 1625 can include hardware and/or software elements configured for performing I/O operations. One or more input devices 1650 and/or one or more output devices 1655 may be communicatively coupled to the one or more I/O interfaces 1625.

The one or more input devices 1650 can include hardware and/or software elements configured for receiving information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can include hardware and/or software elements configured for outputting information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements.

A display device or monitor may be used with computer system 1600 and can include hardware and/or software elements configured for displaying information. Some examples include familiar display devices, such as a television monitor, a cathode ray tube (CRT), a liquid crystal display (LCD), or the like.

Communications interface 1630 can include hardware and/or software elements configured for performing communications operations, including sending and receiving data. Some examples of communications interface 1630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1630 may be coupled to communications network/external bus 1680, such as a computer network, to a FireWire bus, a USB hub, or the like. In other embodiments, communications interface 1630 may be physically integrated as hardware on a motherboard or daughter board of computer system 1600, may be implemented as a software program, or the like, or may be implemented as a combination thereof.

In various embodiments, computer system 1600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

As suggested, FIG. 16 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method for developing applications, the method comprising:
at a computer system having a processor and a memory:
defining a view object of an application development framework that presents data stored in datasources according to a predetermined view in applications built on the datasources using the application development framework, and storing the view object in the memory;
receiving information mapping each of a plurality of attributes of the view object to data stored in at least one datasource of the datasources;
configuring attribute security with respect to at least two attributes of the plurality of attributes of the view object at least in part by:
receiving expressions that restrict output in the applications of the data mapped to the at least two attributes of the plurality of attributes of the view object in the predetermined view, wherein a first expression of the expressions corresponds to a first role and a first privilege of an identified user, and a second expression of the expressions corresponds to a second role and a second privilege of the identified user; and
defining a first security property and a second security property of the at least two attributes, and storing values for the first security property and the second security property in a table of properties defined for the view object;
generating an application with the application development framework based at least in part on the view object;
responsive to a request corresponding to the view object, and based at least in part on the first security property and the second security property and the values stored in the table of properties defined for the view object, restricting access, allowed to the identified user according to the first role, to first data mapped to the at least two attributes of the view object, and restricting output, via the application, of second data mapped to the at least two attributes of the view object in the predetermined view according to the second role so that data corresponding to the at least two attributes is excluded from a record and/or a row that is output;
wherein each attribute of the plurality of attributes corresponds to one or both of a respective field of the record and a respective column of the row.

2. The method of claim 1, further comprising:
receiving information adding a predetermined named property designated by the application development framework for attribute-based security.

3. The method of claim 2, wherein the receiving the information adding the predetermined named property comprises receiving input from the identified user interacting with one or more graphical user interfaces associated with the application development framework, the one or more graphical user interfaces configured to enable users to add non-preexisting properties to attributes specified by view object of the application development framework.

4. The method of claim 1, wherein the receiving the expressions comprises receiving a reference to one or more business objects stored in the at least one datasource as entity objects.

5. The method of claim 1, further comprising:
generating the view object as a component of the application wherein an eXtensible Markup Language (XML) file definition is generated for the view object.

6. A non-transitory, computer-readable medium storing computer-executable code for developing applications that provide data security when executed by one or more processors associated with one or more computer systems, the non-transitory, computer-readable medium comprising:
code configured to define a view object of an application development framework that presents data stored in datasources according to a predetermined view in applications built on the datasources using the application development framework, and store the view object in memory;

code configured to receive information mapping each of a plurality of attributes of the view object to data stored in at least one datasource of the datasources;

code to configure attribute security with respect to at least two attributes of the view object at least in part by:

receiving expressions that restrict output in the applications of the data mapped to the at least two attributes of the plurality of attributes of the view object in the predetermined view, wherein a first expression of the expressions corresponds to a first role and a first privilege of an identified user, and a second expression of the expressions corresponds to a second role and a second privilege of the identified user; and defining a first security property and a second security property of the at least two attributes, and storing values for the first security property and the second security property in a table of properties defined for the view object;

code configured to generate an application with the application development framework based at least in part on the view object;

code configured to, responsive to a request corresponding to the view object, and based at least in part on the first security property and the second security property and the values stored in the table of the properties defined for the view object, restricting access, allowed to the identified user according to the first role, to first data mapped to the at least two attributes of the view object, and restrict output, via the application, of second data mapped to the at least two attributes of the view object in the predetermined view according to the second role so that data corresponding to the at least two attributes is excluded from a record and/or a row that is output;

wherein each attribute of the plurality of attributes corresponds to one or both of a respective field of the record and a respective column of the row.

7. The non-transitory, computer-readable medium of claim 6, further comprising:

code configured to receive information adding a predetermined named property designated by the application development framework for attribute-based security.

8. The non-transitory, computer-readable medium of claim 7, wherein the code configured to receive the information adding the predetermined named property comprises code configured to receive from the identified user interacting with one or more graphical user interfaces associated with the application development framework, the one or more graphical user interfaces configured to enable users to add non-preexisting properties to attributes specified by view object of the application development framework.

9. The non-transitory, computer-readable medium of claim 6, wherein the code configured to receive the expressions comprises code configured to receive a reference to one or more business objects stored in the at least one datasource as entity objects.

10. The non-transitory, computer-readable storage medium of claim 6, further comprising:

code configured to generate the view object as a component of the application wherein an eXtensible Markup Language (XML) file definition is generated for the view object.

* * * * *

UNITED STATES PATENT AND TRADEMARK OFFICE
CERTIFICATE OF CORRECTION

PATENT NO. : 9,753,737 B2
APPLICATION NO. : 12/722406
DATED : September 5, 2017
INVENTOR(S) : Munday et al.

It is certified that error appears in the above-identified patent and that said Letters Patent is hereby corrected as shown below:

In Column 13, Line 59, after "object" insert -- . --.

In Column 13, Line 61, after "object" insert -- . --.

In Column 13, Line 63, after "object" insert -- . --.

In Column 13, Line 64, after "object" insert -- . --.

In Column 13, Line 66, after "object" insert -- . --.

In Column 13, Line 67, after "values" insert -- . --.

In Column 19, Line 8, in Claim 6, after "two attributes" insert -- of the plurality of attributes --.

Signed and Sealed this
Twenty-second Day of May, 2018

Andrei Iancu
*Director of the United States Patent and Trademark Office*